United States Patent
Livingston

(10) Patent No.: US 8,727,635 B2
(45) Date of Patent: May 20, 2014

(54) MPO TRUNK CONCATENATION ADAPTER

(75) Inventor: Joseph C. Livingston, Frisco, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 457 days.

(21) Appl. No.: 13/086,101

(22) Filed: Apr. 13, 2011

(65) Prior Publication Data

US 2011/0249942 A1 Oct. 13, 2011

Related U.S. Application Data

(60) Provisional application No. 61/323,571, filed on Apr. 13, 2010.

(51) Int. Cl.
G02B 6/38 (2006.01)
G02B 6/26 (2006.01)
G02B 6/42 (2006.01)

(52) U.S. Cl.
CPC ............ *G02B 6/3825* (2013.01); *G02B 6/3869* (2013.01); *G02B 6/3885* (2013.01); *G02B 6/3807* (2013.01); *G02B 6/381* (2013.01); *G02B 6/423* (2013.01); *G02B 6/26* (2013.01)
USPC .................. 385/73; 385/50; 385/52; 385/59; 385/78

(58) Field of Classification Search
CPC .. G02B 6/3869; G02B 6/3885; G02B 6/3807; G02B 6/381; G02B 6/423; G02B 6/26; G02B 6/3825
USPC ................. 385/49–53, 56, 57, 59, 62, 65, 73, 385/75–78, 83, 88–89, 139
See application file for complete search history.

(56) References Cited

U.S. PATENT DOCUMENTS

| | | | |
|---|---|---|---|
| 5,867,621 | A | 2/1999 | Luther et al. |
| 6,045,270 | A | 4/2000 | Weiss et al. |
| 6,257,769 | B1 | 7/2001 | Watanabe et al. |
| 6,402,338 | B1 | 6/2002 | Mitzel et al. |
| 6,447,171 | B1 | 9/2002 | Demangone et al. |
| 7,416,347 | B2 | 8/2008 | Livingston et al. |
| 7,537,393 | B2 | 5/2009 | Anderson et al. |
| 7,758,257 | B2 | 7/2010 | Anderson et al. |
| 2001/0008571 | A1 | 7/2001 | Chivers |
| 2003/0087505 | A1 | 5/2003 | Deane |

(Continued)

FOREIGN PATENT DOCUMENTS

| | | |
|---|---|---|
| EP | 0 800 100 A1 | 10/1997 |
| EP | 100 03 420 A1 | 10/2000 |
| JP | 4-253005 A | 9/1992 |

*Primary Examiner* — Uyen Chau N Le
*Assistant Examiner* — Michael Mooney
(74) *Attorney, Agent, or Firm* — Muncy, Geissler, Olds & Lowe, P.C.

(57) ABSTRACT

An MPO connector adapter to connect a first female MPO connector to a second female MPO connector includes a housing. An adapter ferrule is retained within the housing. First and second alignment pin sections extend from a first face of the adapter ferrule to mate with guide holes of the first female MPO connector. Third and fourth alignment pin sections extend from an opposite face of the adapter ferrule to mate with guide holes of the second female MPO connector. Optical fibers within the adapter ferrule couple optical signals from the first female MPO connector to the second female MPO connector.

19 Claims, 5 Drawing Sheets

(56) References Cited

U.S. PATENT DOCUMENTS

| | | |
|---|---|---|
| 2004/0105628 A1* | 6/2004 | Morse et al. .................. 385/89 |
| 2005/0271338 A1 | 12/2005 | Livingston |
| 2007/0110373 A1 | 5/2007 | Dudek et al. |
| 2009/0226140 A1 | 9/2009 | Belenkiy et al. |
| 2009/0257718 A1 | 10/2009 | Nishimura et al. |
| 2009/0290838 A1 | 11/2009 | Lin et al. |
| 2011/0044583 A1 | 2/2011 | Dalton et al. |

* cited by examiner

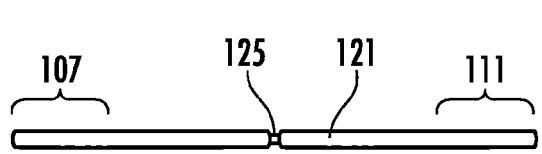
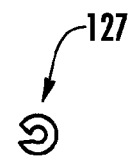
FIG. 5  FIG. 6
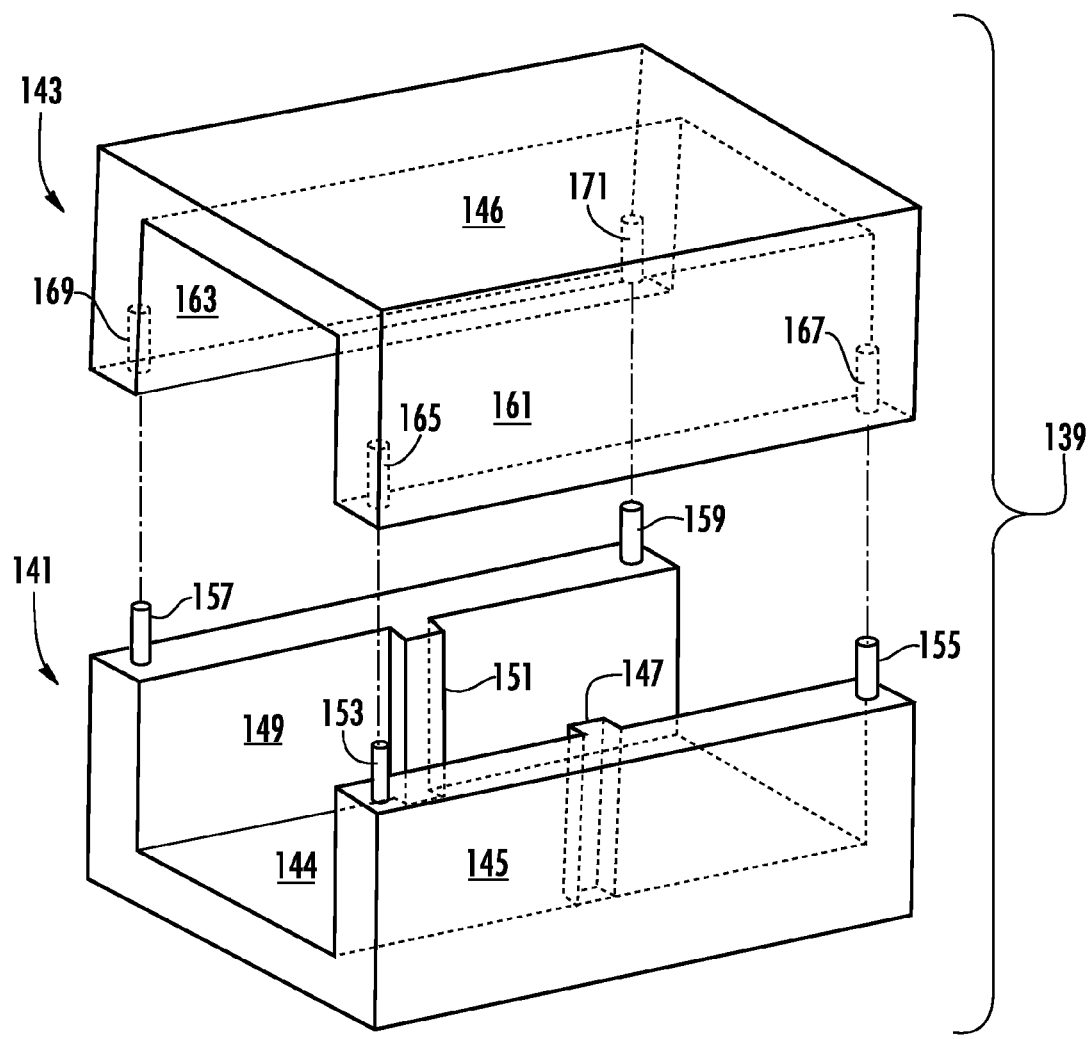
FIG. 7

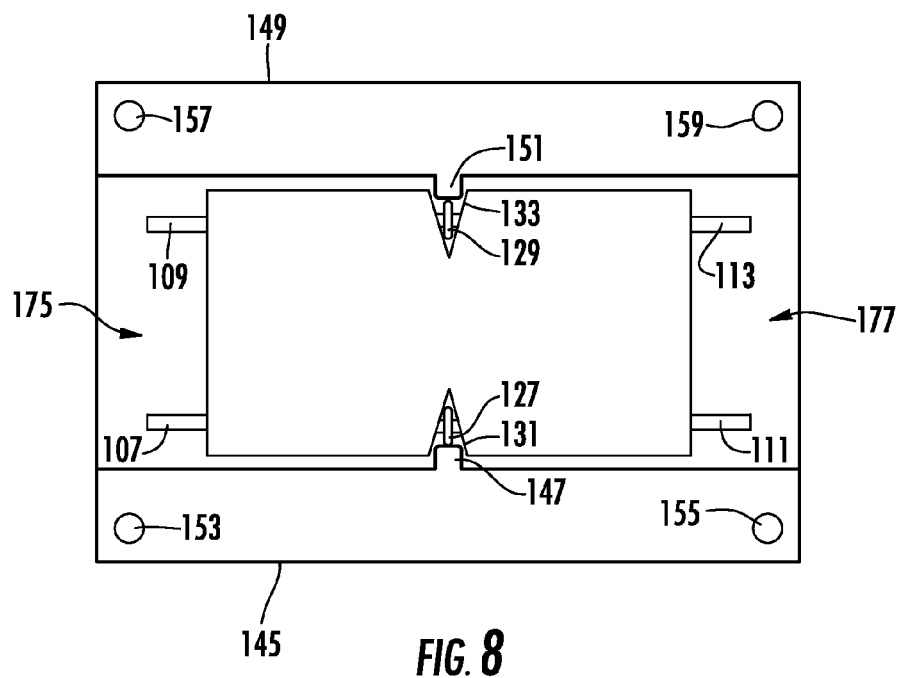
FIG. 8
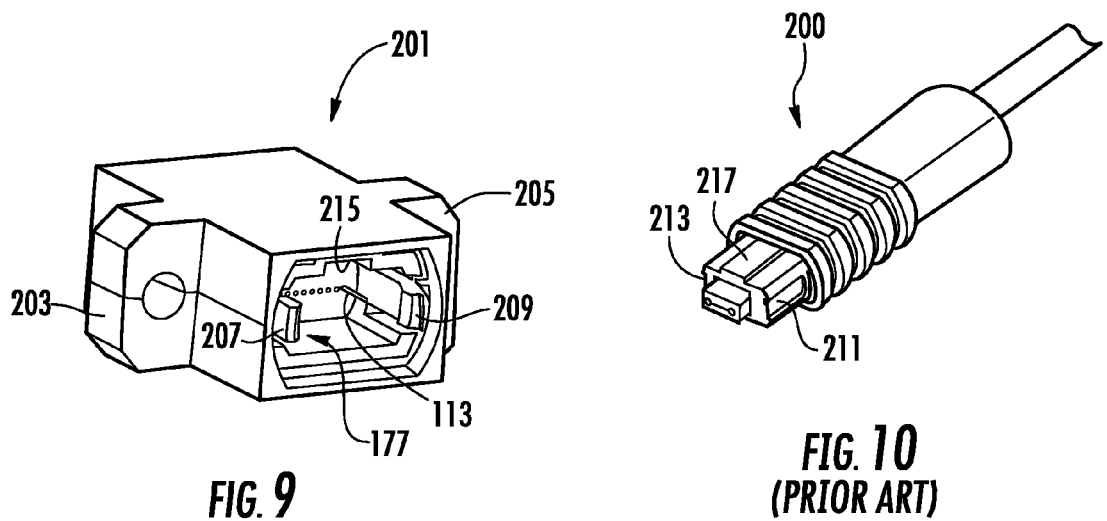
FIG. 9
FIG. 10
(PRIOR ART)

MPO TRUNK CONCATENATION ADAPTER

This application claims the benefit of U.S. Provisional Application No. 61/323,571, filed Apr. 13, 2010, the entire contents of which are herein incorporated by reference.

BACKGROUND OF THE INVENTION

1. Field of the Invention

The present invention relates to MPO cords or cables. More particularly, the present invention relates to an adapter to facilitate a connection link between MPO connectors at the ends of MPO cords and cables to permit attachment of one female MPO connector to another female MPO connector.

2. Description of the Related Art

Cord and cables with multiple-fiber push-on/pull-off (MPO) connectors are generally known in the art. Such connectors relate to IEC-61754-7 and EIA/TIA 604-5 (FOCIS 5) standards, which are incorporated herein by reference. MPO patch cords have MPO connectors that typically exist in two genders—male with alignment pins or female without alignment pins.

In FIG. 1, reference numeral 11 denotes a male MPO connector, in accordance with the prior art. In initial construction, the male MPO connector 11 has first and second holes 13 and 15 formed in a termination end or front face 17 of a first ferrule 18. First and second alignment pins 19 and 21 reside within the first and second holes 13 and 15, respectively, and protrude away from the front face 17 of the first ferrule 18.

Fiber ends 23 are located in a single row and are aligned between the first and second alignment pins 19 and 21. Although FIG. 1 illustrates eight fiber ends 23 located between the first and second alignment pins 19 and 21, it is known to have twelve fiber ends in a single row, twenty-four fiber ends in two rows, forty-eight fiber ends in four rows, or seventy-two fiber ends in six rows between the first and second alignment pins 19 and 21.

In FIG. 2, reference numeral 27 denotes a female MPO connector, in accordance with the prior art. The female MPO connector 27 has third and fourth holes 29 and 31 formed in a termination end or front face 33 of a second ferrule 35. The third and fourth holes 29 and 31 are empty and do not possess any alignment pins. Rather, the third and fourth holes 29 and 31 are provided as guidance holes to receive the first and second alignment pins 19 and 21 of a mating male MPO connector or mating male MPO port.

Fiber ends 37 are located in a single row and are aligned between the third and fourth holes 29 and 31. Although FIG. 2 illustrates eight fiber ends 37 located between the third and fourth holes 29 and 31, it is known to have twelve fiber ends in a single row, twenty-four fiber ends in two rows, forty-eight fiber ends in four rows, or seventy-two fiber ends in six rows between the third and fourth holes 29 and 31.

In accordance with the prior art, it can be seen that a female MPO connector 27 cannot be mated to another female MPO connector 27 or female MPO port accurately. Female MPO connectors 27 have only guidance holes 29 and 31. There are no alignment pins associated with female MPO connectors 27 or female MPO ports. Therefore, a precision alignment during mating could not be achieved.

Also in accordance with the prior art, it can be seen that a male MPO connector 11 cannot be mated to another male MPO connector 11. Male MPO connectors 11 have first and second alignment pins 19 and 21. There are no guidance holes associated with male MPO connectors 11 or male MPO ports to receive the alignment pins 19 and 21. Therefore, a precision alignment during mating could not be achieved.

In the prior art, an MPO patch cord having a male MPO connector at each end is known. An MPO patch cord having a female MPO connector at each end is known. An MPO patch cord having a male MPO connector at one end and a female MPO connector at the other end is also known. These constitute the three known types of MPO-to-MPO patch cords.

SUMMARY OF THE INVENTION

The Applicant has appreciated drawbacks with the MPO patch cords, MPO connectors and MPO ports of the background art.

To be fully prepared, a technician must carry a plurality of MPO-to-MPO cords of the three known types to a job site in order to have patch cords for most potential interconnection situations. Most commonly, the technician only carries a plurality of MPO patch cords having female MPO connectors at both ends (e.g., a female-to-female MPO trunk cord), because a female-to-female MPO trunk cord is typically required in most situations where two components of equipment, each having a male MPO port, are to be connected. Therefore, if the female-to-female MPO cord is too short to reach between the two components, the technician has no way to solve the problem, since as discussed above, the technician cannot mate the female MPO connector of a first MPO cord to the female MPO connector of a second MPO cord in order to increase the connection length of the overall cordage to reach between the two components having male MPO ports. Rather, the project has to be put on hold while a female-to-male MPO cord is retrieved from a supply area or ordered from a supply house.

It is an object of the present invention to address this drawback associated with the MPO patch cords of the background art.

These and other objects are accomplished by an MPO connector adapter to connect a first female MPO connector to a second female MPO connector.

Further, these and other objects are accomplished by an MPO connector adapter to connect a first female MPO connector to a second female MPO connector including a housing, an adapter ferrule within the housing, first and second alignment pin sections extending from a first face of the adapter ferrule, and third and fourth alignment pin sections extending from a second face of the adapter ferrule.

Moreover, these and other objects are accomplished by an MPO connector adapter to connect a first female MPO connector to a second female MPO connector including a housing, an adapter ferrule within the housing, and first and second alignment pins extending through the adapter ferrule, wherein first and second ends of the first and second alignment pins, respectively, extend from a first face of the adapter ferrule, and third and fourth ends of the first and second alignment pins, respectively, extend from a second face of the adapter ferrule, and wherein the second face is on an opposite side of the ferrule as compared to the first face.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 5 is a top view of an alignment pin used in the adapter ferrule of FIG. 3;

FIG. 6 is a side view of a clip for attachment to the alignment pin;

FIG. 7 is an exploded view in partial transparency illustrating the construction of a housing for the adapter ferrule;

FIG. 8 is a top view of the adapter ferrule of FIG. 3 residing in a lower half of the housing of FIG. 7;

FIG. 9 is a front perspective view of an MPO connector adapter in accordance with one embodiment of the present invention;

FIG. 10 is a front perspective view of a female MPO connector, in accordance with the prior art.

DETAILED DESCRIPTION OF EMBODIMENTS OF THE INVENTION

Figure 1:
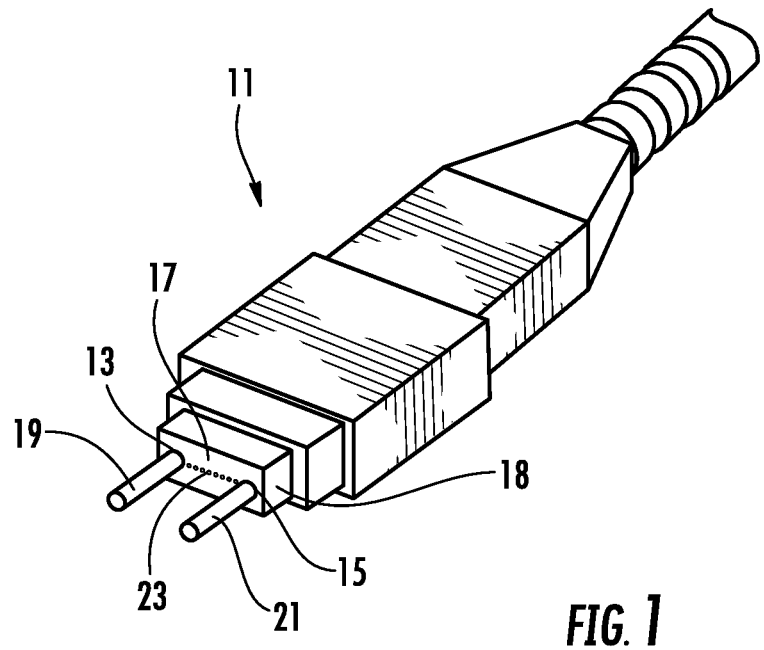
FIG. 1 is a front perspective view of a male MPO connector, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
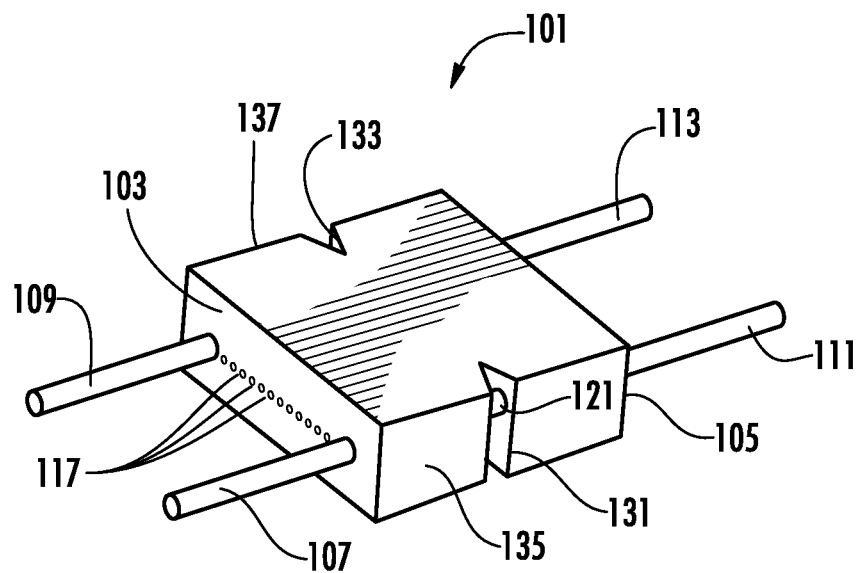
FIG. 3 is a front perspective view of an adapter ferrule, in accordance with the present invention.
Figure 4:
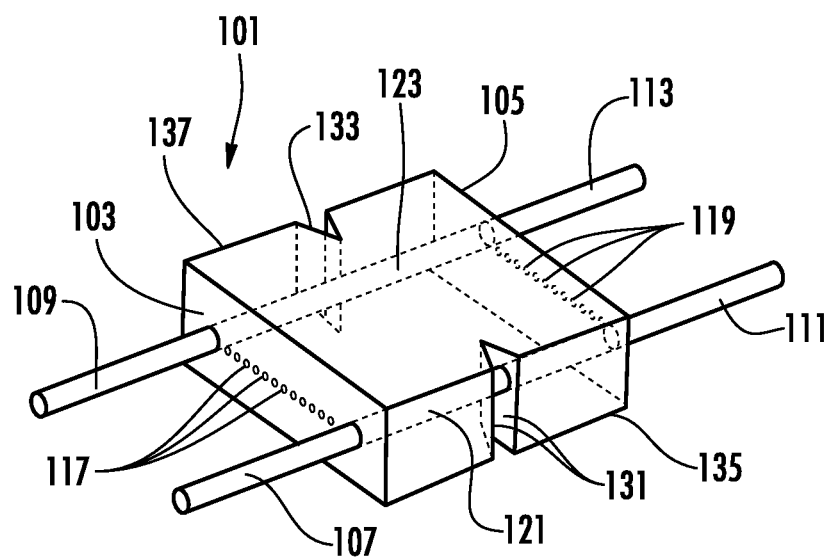
FIG. 4 is a front perspective view of the adapter ferrule of FIG. 3 with partial transparency to illustrated backside and internal constructions.

FIG. 3 is a front perspective view of a pre-polished, MPO adapter ferrule 101, in accordance with one embodiment of the present invention. FIG. 4 is the same view of the adapter ferrule 101 of FIG. 3, but illustrating some of the hidden and internal features in dashed lines. The adapter ferrule 101 includes a first face 103 and a second face 105. The second face 105 is located on an opposite side of the adapter ferrule 101, as compared to the first face 103.

First and second alignment pin sections 107 and 109 extend from the first face 103 of the adapter ferrule 101. Third and fourth alignment pin sections 111 and 113 extend from the second face 105 of the adapter ferrule 101.

A plurality of fibers 115 (See FIG. 11) are located within and/or embedded within the adapter ferrule 101, e.g., molded into the adapter ferrule 101 during initial construction. Each of the fibers 115 has a first fiber end 117 disposed adjacent to the first face 103 and a second fiber end 119 disposed adjacent to the second face 105. The first fiber ends 117 are formed into an array and located between the first and second alignment pin sections 107 and 109. The second fiber ends 119 are formed into an array and located between the third and fourth alignment pin sections 111 and 113. Typically, the first and second fiber ends 117 and 119 are polished flat. However, the first and second fiber ends 117 and 119 may be polished to be slightly concave into the first and second faces 103 and 105. Alternatively, each of the first and second fiber ends 117 and 119 may terminate to a lens seated into one of the first and second faces 103 and 105 to form an expanded beam connector.

In the embodiment illustrated in FIGS. 3 and 4, the first fiber ends 117 are located in a single aligned row between the first and second alignment pin sections 107 and 109, and the second fiber ends 119 are located in a single aligned row between the third and fourth alignment pin sections 111 and 113. FIGS. 3 and 4 show twelve fiber ends in a single row disposed on the first face 103 and twelve fiber ends in a single row disposed on the second face 105. However, other configurations are possible. For example, the first fiber ends could consist of eight fiber ends in a single row, twenty-four fiber ends in two rows, forty-eight fiber ends in four rows, or seventy-two fiber ends in six rows.

In one embodiment, the first alignment pin section 107 is a first end portion of a first alignment pin 121 and the third alignment pin section 111 is an opposite, second end portion of the first alignment pin 121, as illustrated in FIG. 5. Likewise, the second alignment pin section 109 is a first end portion of a second alignment pin 123 and the fourth alignment pin section 113 is an opposite, second end portion of the second alignment pin 123. Hence, the first and second alignment pins 121 and 123 extend completely through the adapter ferrule 101.

As best seen in FIG. 5, the first alignment pin 121 includes a first reduced diameter portion 125 proximate a midpoint between its ends. Likewise, the second alignment pin 123 includes a second reduced diameter portion proximate a midpoint between its ends. The first and second reduced diameter portions 125 are sized to receive a clip 127, such as the partial clip, or C-shaped clip, illustrated in FIG. 6.

Figure 11:
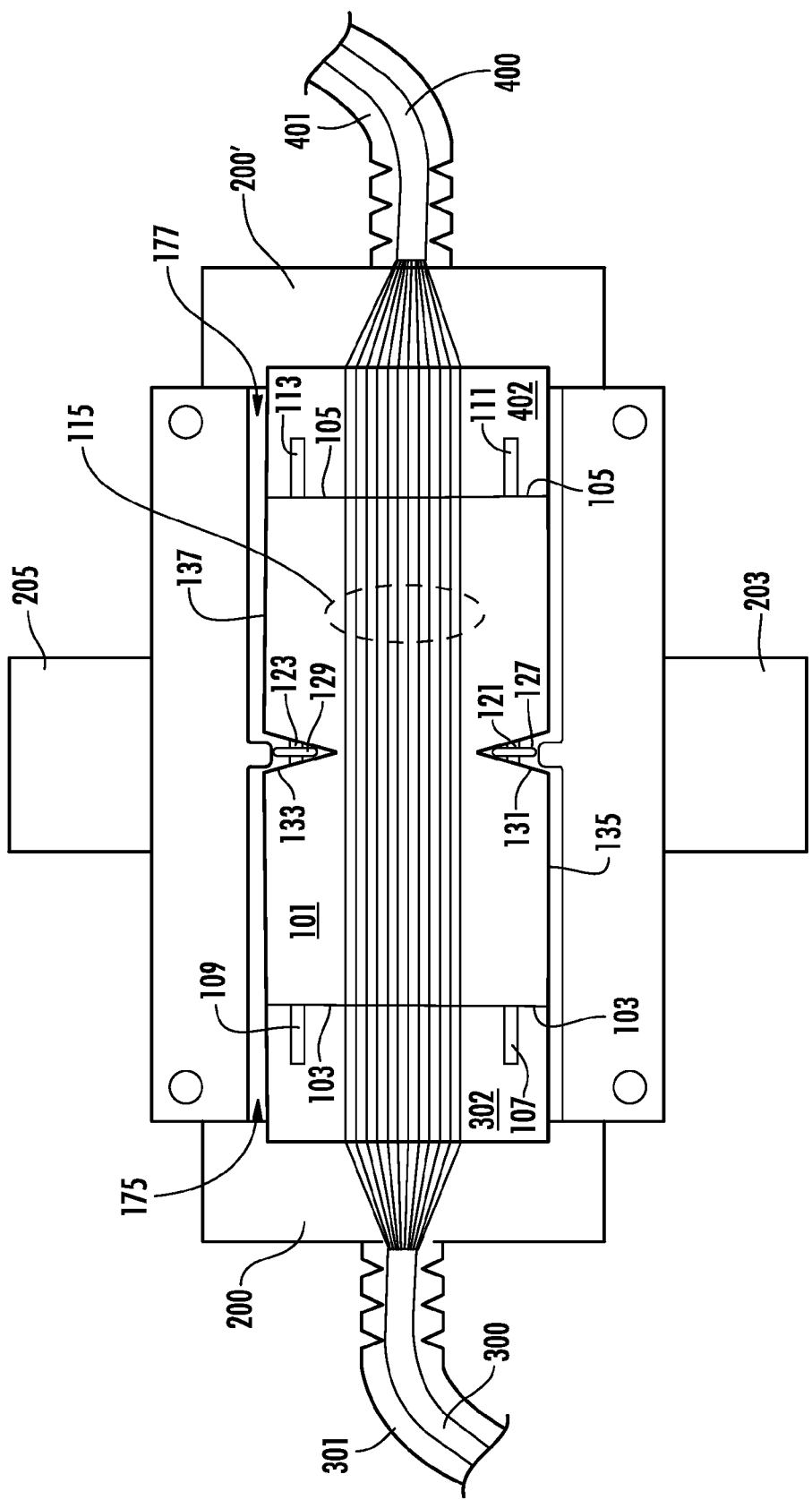
FIG. 11 is a top view, similar to FIG. 8, but illustrating the fiber connections between the MPO connector adapter and first and second female MPO connectors.

As best seen in FIG. 11, a first clip 127 is seated into the first reduced diameter portion 125 of the first alignment pin 121, and a second clip 129 is seated into the second reduced diameter portion of the second alignment pin 123. The first clip 127 is sized to at least partially encircle the first alignment pin 121 at the first reduced diameter portion 125, while remaining snapped onto the first reduced diameter portion 125. Likewise, the second clip 129 is sized to snap onto and at least partially encircle the second alignment pin 123 at its second reduced diameter portion.

The adapter ferrule 101 includes a first slot 131 providing access to the first clip 127, such that the first clip 127 may be inserted onto and/or removed from the first reduced diameter portion 125 of the first alignment pin 121. Also, the adapter ferrule 101 includes a second slot 133 providing access to the second clip 129, such that the second clip 129 may be inserted onto and/or removed from the second reduced diameter portion of the second alignment pin 123. The first slot 131 is provided within a first lateral side 135 of the adapter ferrule 101 and the second slot 133 is provided within a second lateral side 137 of the adapter ferrule 101, opposite to the first lateral side 135.

FIG. 7 illustrates one embodiment of a housing 139 for the adapter ferrule 101 of FIGS. 3 and 4. The housing 139 includes a bottom half 141 and a top half 143.

The bottom half 141 forms a generally U-Shaped tough with a floor 144. A first sidewall 145 includes a first projecting portion 147, such as an inner rib. A second sidewall 149 includes a second projecting portion 151, such as an inner rib. A top surface of the first sidewall 145 includes first and second assembly pegs 153 and 155. A top surface of the second sidewall 149 includes third and fourth assembly pegs 157 and 159.

The top half 143 forms a generally U-Shaped ceiling with a roof 146. A third sidewall 161 extends downward from the roof 146 and may optionally include a projecting portion to align with the first projecting 147. A fourth sidewall 163 extends downward from the roof 146 and may optionally include a projecting portion to align with the second projecting portion 151. A bottom surface of the third sidewall 161 includes first and second assembly holes 165 and 167. A bottom surface of the fourth sidewall 163 includes third and fourth assembly holes 169 and 171.

To assembly the MPO connector adapter, the adapter ferrule 101 is placed into the lower half 141 of the housing 139, as illustrated in FIG. 8. The first projecting portion 147 is seated into the first slot 131 and the second projecting portion 151 is seated into the second slot 133. By this arrangement, the adapter ferrule 101 is retained in the lateral directions (e.g., all direction within the plane of FIG. 8) within the housing 139, but may move slightly in the lateral directions relative to the lower half 141 of the housing 139, as the first projecting portion 147 moves laterally within the first slot 131 and the second projecting portion 151 moves laterally within the second slot 133.

The upper half 143 is attached to the lower half 141 of the housing by applying an epoxy or other type of adhesive to the first through fourth assembly pegs 153, 155, 157 and 159, and inserting the assembly pegs into the first through fourth assembly holes 165, 167, 169 and 171. Of course, other methods may be employed to secure the lower half 141 to the upper half 143, such as blades into slots, screws into threaded holes, adhesives between abutting surfaces, etc.

By this arrangement, the adapter ferrule 101 is retained in the vertical directions (e.g., perpendicular to the plane of FIG. 8) within the housing 139. The adapter ferrule 101 may move slightly in the vertical directions relative to the lower half 141 and upper half 143 of the housing 139, as the first projecting portion 147 moves vertically within the first slot 131 and the second projecting portion 151 moves vertically within the second slot 133. Hence, the adapter ferrule 101 is loosely attached to the housing 139, such that the adapter ferrule 101 may move slightly in all directions within the housing 101 while remaining attached to the housing 139.

Figure 2:
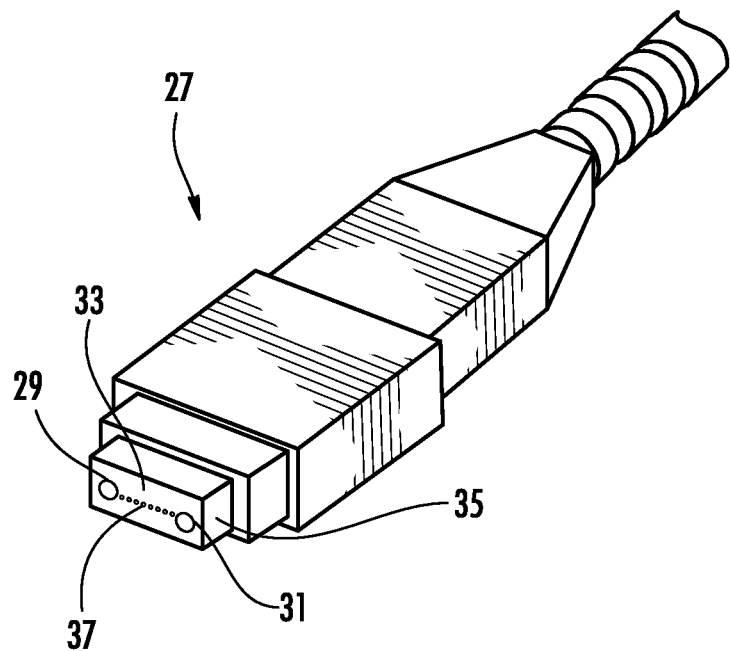
FIG. 2 is a front perspective view of a female MPO connector, in accordance with the prior art.

The loose attachment of the adapter ferrule 101 within the housing 139 will assist in the alignment process to connect a first female MPO connector into a first port 175 of the housing 139 and to connect a second female MPO connector into a second port 177 of the housing 139. Basically, the small amount of play allows the adapter ferrule 101 to move slightly relative to the housing 139 and permit the first through fourth alignment pin sections 107, 109, 111 and 113 to align well with the empty guide holes 29 and 31 (See FIG. 2) in the female MPO connectors 27.

The housing 139 of FIGS. 7 and 8 has been illustrated in simplistic form to better describe the interacting features between the adapter ferrule 101 and the lower and upper halves 141 and 143 of the housing 139. In practice, the exterior of the housing 139 can be constructed to resemble a traditional MPO adapter housing, e.g., having guidance, alignment and securing features. Also, the female MPO connector 27 of FIG. 2 can be constructed to include guidance, alignment and securing features.

For example, FIG. 9 shows an MPO connector adapter 201, according to an embodiment of the present invention, having several guidance, alignment and securing features. Likewise, FIG. 10 shows a female MPO connector 200, according to the prior art, having several guidance, alignment and securing features. In FIG. 9, one added feature is left and right wings 203 and 205 to permit mounting to another structure. Another feature is left and right resilient tabs 207 and 209 to ride in side tracks 211 and 213 of a mating female MPO connector 200, as illustrated in FIG. 10. Finally, there may be a key slot 215 to accept a key 217 on the female MPO connector 200.

The key slot 215 enables the orientation of the female MPO connector 200, as it enters the second port 177 to be specified or controlled. In other words, the second port 177 in FIG. 9 shows a "key up" orientation, and would not permit the MPO female connector 200 of FIG. 10 to be inserted in a "key down" orientation. In one embodiment of the present invention, the orientation of the key slot 215 in the second port 177 would be opposite to the orientation of the key slot in the first port 175. For example, the second port 177 could have a "key up" orientation, while the first port 175 could have a "key down" orientation.

Such a "key up" to "key down" MPO connector adapter is particularly advantageous because it allows additional female-to-female MPO patch cords to be daisy-chained together without adversely effecting the fiber ordering when the last female MPO connector is mated to a male MPO port. In other words, if a first female-to-female MPO patch cord is mated to a "key up" male MPO port, and then the first patch cord is mated to a second female-to-female MPO patch cord using a "key up" to "key down" MPO connector adapter, the female MPO connector at the end of the second patch cord will have its fiber orientations correctly mated to another male MPO port.

Of course, it would be possible to have the keying configurations matching on each side of the MPO connector adapter, if it were desired to reverse the fiber ordering of the second MPO patch cord. For example, the first port 175 could have a "key up" orientation, while the second port 177 could have a "key down" orientation.

FIG. 11 illustrates the interconnection of the multiple fibers within the MPO connector adapter, in accordance with one embodiment of the present invention. Optic fibers 300 within a first patch cord 301 enter into the first ferrule 302 and terminate as polished ends on a termination face of the first ferrule 302. The termination face of the first ferrule 302 is abutted to the first face 103 of the adapter ferrule 101. Likewise, the optic fibers 400 within a second patch cord 401 enter into the second ferrule 402 and terminate as polished ends on a termination face of the second ferrule 402. The termination face of the second ferrule 402 is abutted to the second face 105 of the adapter ferrule 101.

As best seen in FIG. 11, the MPO adapter ferrule 101 permits precise alignment/mating of first and second female MPO connectors 200 and 200'. The first female MPO connector 200 can be mated to the first face 103 of the adapter ferrule 101. The second female MPO connector 200' can be mated to the second face 105 of the adapter ferrule 101. Hence, the interconnection between the two female MPO connectors 200 and 200' will transpire over two interfaces, instead of a single interface, as would be the case if a female MPO connector (FIG. 2) were mated directly to a male MPO connector (FIG. 1). However, with the present lower loss polishing techniques, the two connector interfaces occurring at the first and second faces 103 and 105 of the adapter ferrule 101 is acceptable.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. An MPO connector adapter to connect a first female MPO connector to a second female MPO connector comprising:
   a housing;
   an adapter ferrule within said housing, wherein said adapter ferrule is loosely attached to said housing, such that said adapter ferrule may move in all directions relative to said housing while remaining attached to said housing;
   first and second alignment pin sections extending from a first face of said adapter ferrule; and
   third and fourth alignment pin sections extending from a second face of said adapter ferrule.

2. The MPO connector adapter according to claim 1, wherein said second face is on an opposite side of said adapter ferrule as compared to said first face.

3. The MPO connector adapter according to claim 2, further comprising:
   a plurality of fibers within said adapter ferrule, wherein each of said fibers has a first fiber end disposed adjacent to said first face and a second fiber end disposed adjacent to said second face.

4. The MPO connector adapter according to claim 3, wherein said first fiber ends are located between said first and second alignment pin sections, and wherein said second fiber ends are located between said third and fourth alignment pin sections.

5. The MPO connector adapter according to claim 4, wherein said first fiber ends are located in a single aligned row between said first and second alignment pin sections.

6. The MPO connector adapter according to claim 4, wherein said first fiber ends consist of eight fiber ends in a single row, twelve fiber ends in a single row, twenty-four fiber ends in two rows, forty-eight fiber ends in four rows, or seventy-two fiber ends in six rows.

7. The MPO connector adapter according to claim 1, wherein said adapter ferrule includes a slot and said housing includes a projecting portion seated into said slot to retain said adapter ferrule within said housing.

8. The MPO connector adapter according to claim 1, wherein said first alignment pin section is a first end portion of a first alignment pin and said third alignment pin section is an opposite, second end portion of said first alignment pin, and wherein said second alignment pin section is a first end portion of a second alignment pin and said fourth alignment pin section is an opposite, second end portion of said second alignment pin.

9. An MPO connector adapter to connect a first female MPO connector to a second female MPO connector comprising:
   a housing;
   an adapter ferrule within said housing; and
   first and second alignment pins extending through said adapter ferrule, wherein first and second ends of said first and second alignment pins, respectively, extend from a first face of said adapter ferrule, and third and fourth ends of said first and second alignment pins, respectively, extend from a second face of said adapter ferrule, and wherein said second face is on an opposite side of said ferrule as compared to said first face.

10. The MPO connector adapter according to claim 9, further comprising:
   a plurality of fibers within said adapter ferrule, wherein each of said fibers has a first fiber end disposed adjacent to said first face and a second fiber end disposed adjacent to said second face, and
   wherein said first fiber ends are located between said first and second ends of said first and second alignment pins, and wherein said second fiber ends are located between said third and fourth ends of said first and second alignment pins.

11. The MPO connector adapter according to claim 9, wherein said adapter ferrule is loosely attached to said housing, such that said adapter ferrule may move slightly within said housing while remaining attached to said housing.

12. The MPO connector adapter according to claim 11, wherein said adapter ferrule includes a slot and said housing includes a projecting portion seated into said slot to retain said adapter ferrule within said housing.

13. The MPO connector adapter according to claim 9, wherein said first alignment pin includes a first reduced diameter portion proximate a midpoint between its ends, and wherein said second alignment pin includes a second reduced diameter portion proximate a midpoint between its ends; and further comprising:
- a first clip seated into said first reduced diameter portion and at least partially encircling said first alignment pin; and
- a second clip seated into said second reduced diameter portion and at least partially encircling said second alignment pin.

14. The MPO connector adapter according to claim 13, wherein said adapter ferrule includes a first slot providing access to said first clip and a second slot providing access to said second clip.

15. The MPO connector adapter according to claim 14, wherein said housing includes a first projecting portion and a second projecting portion, and wherein said first projecting portion is seated into said first slot and said second projecting portion is seated into said second slot, such that said adapter ferrule may move slightly relative to said housing as said first projecting portion moves within said first slot and said second projecting portion moves within said second slot.

16. The MPO connector adapter according to claim 14, wherein said first slot is provided within a first lateral side of said adapter ferrule and said second slot is provided within a second lateral side of said adapter ferrule, opposite to said first lateral side.

17. The MPO connector adapter according to claim 10, wherein said first fiber ends are located in a single aligned row between said first and second ends of said first and second alignment pins.

18. The MPO connector adapter according to claim 10, wherein said first fiber ends consist of eight fiber ends in a single row, twelve fiber ends in a single row, twenty-four fiber ends in two rows, forty-eight fiber ends in four rows, or seventy-two fiber ends in six rows.

19. An MPO connector system comprising:
- a first female MPO connector presenting a first terminal with fiber ends from a first cord;
- a second female MPO connector; presenting a second terminal with fiber ends from a second cord; and
- an MPO connector adapter including:
  - a housing;
  - an adapter ferrule within said housing;
  - first and second alignment pins extending through said adapter ferrule, wherein first and second ends of said first and second alignment pins, respectively, extend from a first face of said adapter ferrule, and third and fourth ends of said first and second alignment pins, respectively, extend from a second face of said adapter ferrule, and wherein said second face is on an opposite side of said ferrule as compared to said first face;
- a plurality of fibers within said adapter ferrule, wherein each of said fibers has a first fiber end disposed adjacent to said first face and a second fiber end disposed adjacent to said second face, wherein said first fiber ends are located between said first and second ends of said first and second alignment pins, wherein said second fiber ends are located between said third and fourth ends of said first and second alignment pins, wherein said first fiber ends of said first face of said adapter ferrule mate with said fiber ends of said first terminal of said first female MPO connector, when said first female MPO connector is mated to said MPO connector adapter, and wherein said second fiber ends of said second face of said adapter ferrule mate with said fiber ends of said second terminal of said second female MPO connector, when said second female MPO connector is mated to said MPO connector adapter.

\* \* \* \* \*